US010293438B2

(12) United States Patent
Asada et al.

(10) Patent No.: US 10,293,438 B2
(45) Date of Patent: May 21, 2019

(54) DEVICE AND METHOD FOR MANUFACTURING WELDED SHAPED STEEL

(71) Applicant: NISSHIN STEEL CO., LTD., Tokyo (JP)

(72) Inventors: Hiroshi Asada, Tokyo (JP); Yasuhiro Sakurada, Tokyo (JP); Tooru Ienari, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/717,664

(22) Filed: Sep. 27, 2017

(65) Prior Publication Data
US 2018/0015570 A1    Jan. 18, 2018

Related U.S. Application Data

(63) Continuation of application No. PCT/JP2016/059964, filed on Mar. 28, 2016.

(51) Int. Cl.
*B23K 26/00* (2014.01)
*B23K 11/10* (2006.01)
(Continued)

(52) U.S. Cl.
CPC .............. *B23K 31/003* (2013.01); *B21D 3/05* (2013.01); *B23K 26/21* (2015.10); *B23K 26/26* (2013.01);
(Continued)

(58) Field of Classification Search
CPC .... B23K 11/02; B23K 11/04; B23K 15/0046; B23K 15/0053; B23K 15/008;
(Continued)

(56) References Cited

U.S. PATENT DOCUMENTS 3,787,656 A * 1/1974 Matsumoto ............ B23K 13/02
219/104
4,476,370 A * 10/1984 Kakihara ............. B23K 13/043
219/105

FOREIGN PATENT DOCUMENTS

CN    201231268 Y    5/2009
CN    203778516 U    8/2014
(Continued)

OTHER PUBLICATIONS

International Search Report for PCT/JP2016/059964, dated Jun. 28, 2016, Total of 2 pages.
(Continued)

*Primary Examiner* — Sang Y Paik
(74) *Attorney, Agent, or Firm* — Lynette Wylie; Apex Juris, pllc.

(57) ABSTRACT

A welded shaped steel manufacturing device for weld-connecting a butt portion of a web member having an end butting perpendicularly against a flange member and thereafter correcting in shape the flange member subjected to thermal deformation caused by heat input during welding, the device includes: a corrective device including flange-member correcting rollers arranged for respective ends of the flange member, each configured to press each end on a web-member side of the flange member so as to correct the thermal deformation over a range of the flange member from each end thereof to the butt portion thereof against the web member, and web-member supporting rollers configured to support a web surface of the web member, wherein the flange-member correcting rollers arranged for the respective ends of the flange member apply independent pressures to the respective ends so as to correct the thermal deformation.

4 Claims, 7 Drawing Sheets

(51) Int. Cl.
*B23K 31/00* (2006.01)
*B21D 3/05* (2006.01)
*B23K 26/21* (2014.01)
*B23K 26/26* (2014.01)
*B23K 37/00* (2006.01)
*B23K 37/04* (2006.01)

(52) U.S. Cl.
CPC .......... *B23K 37/00* (2013.01); *B23K 37/0426* (2013.01); *B23K 37/0435* (2013.01)

(58) Field of Classification Search
CPC ...... B23K 20/02; B23K 20/028; B23K 20/04; B23K 20/10; B23K 26/21; B23K 26/211; B23K 26/22; B23K 26/24; B23K 26/26
USPC .... 219/121.63, 121.64, 57, 58, 61.11, 61.12, 219/61.13, 79–81, 86.1, 86.23, 86.24, 219/86.33–86.61, 91.2, 91.23, 101–105
See application file for complete search history.

(56) References Cited

FOREIGN PATENT DOCUMENTS

| CN | 104014617 A | 9/2014 |
|---|---|---|
| JP | 1-099722 A | 4/1989 |
| JP | 2-022211 U | 2/1990 |
| JP | 6-126334 A | 5/1994 |
| JP | 9-285820 A | 11/1997 |
| JP | 3172435 B2 | 3/2001 |
| JP | 2002-282945 A | 10/2002 |
| JP | 2007-152388 A | 6/2007 |
| JP | 2009-119485 A | 6/2009 |
| JP | 2011-83781 A | 4/2011 |
| JP | 2012-135792 A | 7/2012 |
| JP | 2012-206125 A | 10/2012 |
| JP | 5662546 B | 1/2015 |
| JP | WO2016/158874 A1 | 10/2016 |
| RU | 2483848 C1 | 6/2013 |
| SU | 733936 A1 | 5/1980 |
| SU | 1146165 A1 | 3/1985 |

OTHER PUBLICATIONS

Office Action for Taiwan Patent Application No. 105110024, dated Dec. 20, 2017, Total of 9 pages.
Office Action for Canadian Patent Application No. 2981418, dated Oct. 20, 2017, Total of 8 pages.
Japanese Office Action, dated Aug. 30, 2016, for Japanese Patent Application No. 2015-071855 (with English Translation).
Korean Office Action, dated Feb. 7, 2018, for Korean Patent Application No. 10-2017-7027476 (with English Translation).
Korean Decision of Refusal, dated Jun. 7, 2018, for Korean Patent Application No. 10-2017-7027476 (with English Translation).
Russian Office Action, dated May 17, 2018, for Russian Patent Application No. 2017133147 (with English Translation).
Chinese Office Action, dated Apr. 10, 2018, for Chinese Patent Application No. 201680018131.8 (with English Translation).
Canadian Office Action, dated May 4, 2018, for Canadian Patent Application No. 2981418.
Korean Decision of Refusal, dated Jul. 16, 2018, for Korean Patent Application No. 10-2017-7027476 (with English Translation), Total of 7 pages.
Chinese Office Action, dated Oct. 16, 2018, for Chinese Patent Application No. 201680018181.8 (with English Translation), Total of 4 pages.
Extended European Search Report, dated Nov. 20, 2018, for European Patent Application No. 16772755.1, Total of 8 pages.

* cited by examiner

DEVICE AND METHOD FOR MANUFACTURING WELDED SHAPED STEEL

CROSS REFERENCE TO RELATED APPLICATIONS

This is a continuation application of International Patent Application No. PCT/JP2016/059964 filed on Mar. 28, 2016 claiming priority upon Japanese Patent Application No. 2015-071855 filed on Mar. 31, 2015, of which full contents are incorporated herein by reference.

BACKGROUND OF THE INVENTION

Field of the Invention

The present invention relates to a device and a method for manufacturing welded shaped steel, by which thermal deformation caused by heat input during welding is corrected in shape.

Description of the Background Art

Patent Documents 1-4 describe methods for manufacturing welded H-shaped steel by laser-welding a web member and flange members for weld-bonding. In the described methods described in Patent Documents 1-4, a web member and two flange members supplied in such a manner that they are arranged in an H shape are laser-welded at predetermined welding positions for weld-bonding. The two flange members are the same in plate thickness, plate width, and material as each other. The web member is caused to butt against the central portions of their respective flange members in a width direction, and resultant butt portions are laser-welded for weld-bonding.

After laser-welding, due to a great amount of heat input to weld-connected portions, the web member and the flange members thermally distorted are not always weld-connected to each other in such a manner that their perpendicular positioning is maintained. For example, if the butt portions between the web member and the two flange members are irradiated with laser from one web-surface side of the web member (see FIG. 7(a) in Patent Document 2), the two flange members arranged at both ends of the web member are subjected to thermal deformation in such a manner that the two flange members are bent toward a web-member side. It is to be noted that the amount of thermal deformation is the same between the two flange members on the grounds that the two flange members are the same in plate thickness, plate width, and material as each other as well as that the web member is welded to the central portions of their respective flange members in a width direction. In this case, as shown in FIG. 8(a) in Patent Document 2, FIG. 2 in Patent Document 4, and the like, the thermal deformation of the two flange members can be corrected by pushing correcting rollers inward between the two flange members from both above-and-below web-surface sides of the web member.

PRIOR ART DOCUMENTS

Patent Documents

Patent Document 1 Japanese Unexamined Patent Application Publication No. 2009-119485
Patent Document 2 Japanese Unexamined Patent Application Publication No. 2011-83781
Patent Document 3 Japanese Patent No. 5662546
Patent Document 4 Japanese Unexamined Patent Application Publication No. 2012-135792

Problem to be Solved

There are various sorts of welded shaped steel. Specifically, there is an example of the two flange members connected to both the ends of the web member that are different from each other in at least any one of material, plate thickness, and plate width. Further, there is another example of the two flange members that are the same as each other in material, plate thickness, and plate width, but are different from each other in connection position to which the end of the web member is connected (hereinafter, such sorts of welded shaped steel will be referred to as "asymmetric welded shaped steel"). Still further, a welded shaped steel having a web member and a flange member weld-connected to only one end of the web member, such as J-shaped steel and T-shaped steel, also falls within the scope of "asymmetric welded shaped steel."

The former sort of "asymmetric welded shaped steel," when viewed from a position of the web member placed horizontally, has right and left flange members extending above or below web-surface side of the welding member, where the right and left flange members are subjected individually to different amounts of thermal deformation. It is therefore difficult to correct such thermal deformation of the right and left flange members by using the correcting rollers described in Patent Documents 2, 4. More specifically, in order to correct the thermal deformation to restore the intended cross-sectional shape of the right and left flange members, it is required that appropriate corrective forces in accordance with different amounts of thermal deformation are applied individually to the right and left flange members; however, it is structurally impossible for the correcting rollers described in Patent Documents 2, 4 to fulfill such requirements for the appropriate corrective forces. Furthermore, the latter sort of "asymmetric welded shaped steel" has only one flange member, which does not logically allow the use of the correcting rollers in Patent Documents 2, 4 that are useful upon the precondition that two flange members exist.

SUMMARY OF THE INVENTION

In view of the above-described problems, there is created the present invention whose objective is to provide a device and method for manufacturing welded shaped steel, which is capable of easily making a correction to restore the intended cross-sectional shape of "asymmetric welded shaped steel" even if portions of the flange members are subjected respectively to different amounts of thermal deformation during welding.

Means for Solving Problems

A welded shaped steel manufacturing device, according to the present invention, for weld-connecting a butt portion of a web member having an end butting perpendicularly against a flange member and thereafter correcting in shape the flange member subjected to thermal deformation caused by heat input during welding, the device comprises: a corrective device including flange-member correcting rollers arranged for respective ends of the flange member, each configured to press each end on a web-member side of the flange member so as to correct the thermal deformation over a range of the flange member from each end thereof to the butt portion thereof against the web member, and web-member supporting rollers configured to support a web surface of the web member. The flange-member correcting rollers arranged for the respective ends of the flange member are further configured to apply independent pressures to the respective ends so as to correct the thermal deformation.

According to the above-configured welded shaped steel manufacturing device, in a state of the web-member supporting rollers supporting the web surface of the web member, the flange-member correcting rollers press ends on the web-member side of the flange member, respectively, with their respective pressures independently, so that each bending moment acts on the range of the flange member from each end thereof to the butt portion thereof butting against the web member, thereby correcting the thermal deformation generated on each range of the flange member. In other words, the pressures are capable of being applied independently to their respective ends of the flange member, thereby allowing each end of the flange member to be corrected in accordance with the amount of thermal deformation generated on each range of the flange member.

The corrective device may further include a flange-member supporting roller configured to support the butt portion of an end of the web member and the flange member butting against each other from a surface of the flange member opposite to the butt portion.

According to the above-configured welded shaped steel manufacturing device, the flange-member supporting roller, arranged such that they support the butt portion of the end of the web member and the flange member butting against each other from the surface opposite to the butt portion, is included in said device, and therefore, a bending moment acting on the web member, out of bending moments acting in-between the flange-member correcting rollers and the web-member supporting rollers, can be suppressed to zero or minute amount. As a result, bending deformation of the web member can be prevented or suppressed when correcting the thermal deformation of the flange member.

Each of the flange-member correcting rollers may have a conical surface to press each end of the flange member, and the corrective device may further include flange-member correcting roller positioning machines, for the respective flange-member correcting rollers, capable of moving the respective flange-member correcting rollers in a width direction of the flange member.

According to the above-configured welded shaped steel manufacturing device, the flange-member correcting rollers are moved in a width direction of the flange member by the flange-member correcting roller positioning machines so that the flange-member correcting rollers can be arranged for the respective ends of the flange member. In addition, height positions of the flange-member correcting rollers are adjusted by the flange-member correcting roller positioning machines, respectively, so that the pressures applied by the flange-member correcting rollers to their respective ends of the flange member can also be adjusted.

A welded shaped steel manufacturing method, according to the present invention, including the steps of causing an end of a web member to butt perpendicularly against a flange member, weld-connecting a butt portion, and thereafter, correcting in shape the flange member subjected to thermal deformation caused by heat input during welding, the method comprises the steps of: applying, by flange-member correcting rollers arranged for respective ends of the flange member, independent pressures to the respective ends on a web-member side of the flange member, while supporting, by web-member supporting rollers, a web surface of the web member, thereby correcting the thermal deformation over a range of the flange member from each end thereof to the butt portion thereof against the web member.

According to the above-configured welded shaped steel manufacturing method, while the web surface of the web member being supported by the web-member supporting rollers, ends on the web-member side of the flange member are pressed by the flange-member correcting rollers with their respective pressures independently, so that each bending moment acts on the range of the flange member from each end thereof to the butt portion thereof butting against the web member, thereby correcting the thermal deformation generated on each range of the flange member. In other words, the pressures are capable of being applied independently to their respective ends of the flange member, thereby allowing each end of the flange member to be corrected in accordance with the amount of thermal deformation generated on each range of the flange member.

In the welded shaped steel manufacturing method having the above-described steps, said thermal deformation may be corrected, while supporting, by a flange-member supporting roller, the butt portion of an end of the web member and the flange member butting against each other from a surface of the flange member opposite to the butt portion.

According to the above-configured welded shaped steel manufacturing method, said thermal deformation is corrected while the butt portion of the end of the web member and the flange member butting against each other from the surface opposite to the butt portion being supported by the flange-member supporting roller. A bending moment acting on the web member can therefore be suppressed to zero or minute amount, where the bending moment is out of bending moments acting in-between the flange-member correcting rollers and the web-member supporting rollers. As a result, bending deformation of the web member can be prevented or suppressed when correcting the thermal deformation of the flange member.

In the welded shaped steel manufacturing method having the above-described steps, each of the flange-member correcting rollers may have a conical surface to press each end of the flange member, and prior to correcting said thermal deformation, the flange-member correcting rollers may be moved in a width direction of the flange member by flange-member correcting roller positioning machines so that the flange-member correcting rollers are arranged for the respective ends of the flange member.

According to the above-configured welded shaped steel manufacturing method, the flange-member correcting rollers are moved in a width direction of the flange member by the flange-member correcting roller positioning machines so that the flange-member correcting rollers can be arranged for the respective ends of the flange member, which allows the correction of flange members of welded shaped steel in various shapes and dimensions. In addition, height positions of the flange-member correcting rollers are adjusted by the flange-member correcting roller positioning machines, respectively, so that the pressures applied by the flange-member correcting rollers to their respective ends of the flange member can also be adjusted.

Advantageous Effects of the Invention

According to the present invention, correction can easily be made of "asymmetric welded shaped steel" to restore its intended cross-sectional shape even if portions of its flange members are subjected respectively to different amounts of thermal deformation generated after welding.

BRIEF DESCRIPTIONS OF THE DRAWINGS

For more thorough understanding of the present invention and advantages thereof, the following descriptions should be read in conjunction with the accompanying drawings in which.

DESCRIPTIONS OF EMBODIMENTS OF THE INVENTION

Hereafter, a device for manufacturing welded shaped steel and a method for manufacturing welded shaped steel through the use of the device as an embodiment of the present invention will be described with reference to the drawings. In an embodiment, explanations will be provided for the manufacture of H-shaped steel from three steel plates already formed in predetermined dimensions by cutting or the like, arranged so as to have an H-shaped cross-section, and supplied. It is to be noted, hereafter, that a conveyance direction of two flange members along with a web member to form H-shaped steel will be referred to simply as a "conveyance direction."

Figure 2:
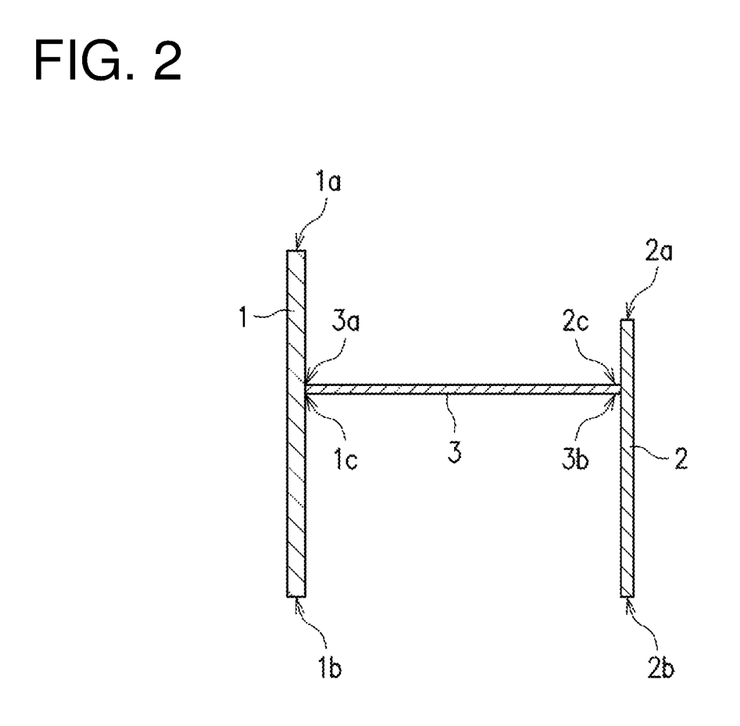
FIG. 2 depicts a cross-sectional view of an example of asymmetric welded H-shaped steel.

Firstly, explanations will be provided for the welded shaped steel to be manufactured by the welded shaped steel manufacturing device in an embodiment. As shown in FIG. 2, the welded shaped steel to be manufactured by the welded shaped steel manufacturing device in this embodiment is "asymmetric welded shaped steel" having a first flange member (1) and a second flange member (2) different from each other in plate thickness and plate width, and also different from each other in butt position of a web member (3) butting against the first and second flange members (1, 2). The first flange member (1) is, for example, a plate having a width of 100 mm, a length of 8 m, and a thickness of 3.2 mm, and a connection position (1c) of the plate connected to a web member (3) is set 40-mm apart from an upper end (1a) as well as 60-mm apart from a lower end (1b). The second flange member (2) is, for example, a plate having a width of 80 mm, a length of 8 m, and a thickness of 2.3 mm, and a connection position (2c) of the plate connected to a web member (3) is set 20-mm apart from an upper end (2a) as well as 60-mm apart from a lower end (2b). The web member (3) is, for example, a plate having a width of approximately 100 mm, a length of 8 m, and a thickness of 1.6 mm, and ends (3a, 3b) of the plate are connected to the first and second flange members (1, 2), respectively. The first flange member (1), the second flange member (2), and the web member (3) are made of, for example, at least any one sort of Zn-coated steel, Al-coated steel, stainless steel, special steel, and common steel.

The welded shaped steel manufacturing device includes a plate conveying device (not shown), a welding portion supporting device (200) (see FIGS. 3, 4), a corrective device (100) (see FIG. 1), and the like. These devices are arranged in line from an upstream side along a conveyance direction in the order of: the plate conveying device; the welding portion supporting device (200); the corrective device (100).

The plate conveying device conveys the two flange members (1, 2) and the web member (3), in a state where the two flange members (1, 2) are arranged vertically to be parallel to each other and where the web member (3) is interposed horizontally between the two flange members (1, 2), toward the welding portion supporting device (200), while holding the two flange members (1, 2) from both of their outer-surface sides.

Figure 3:
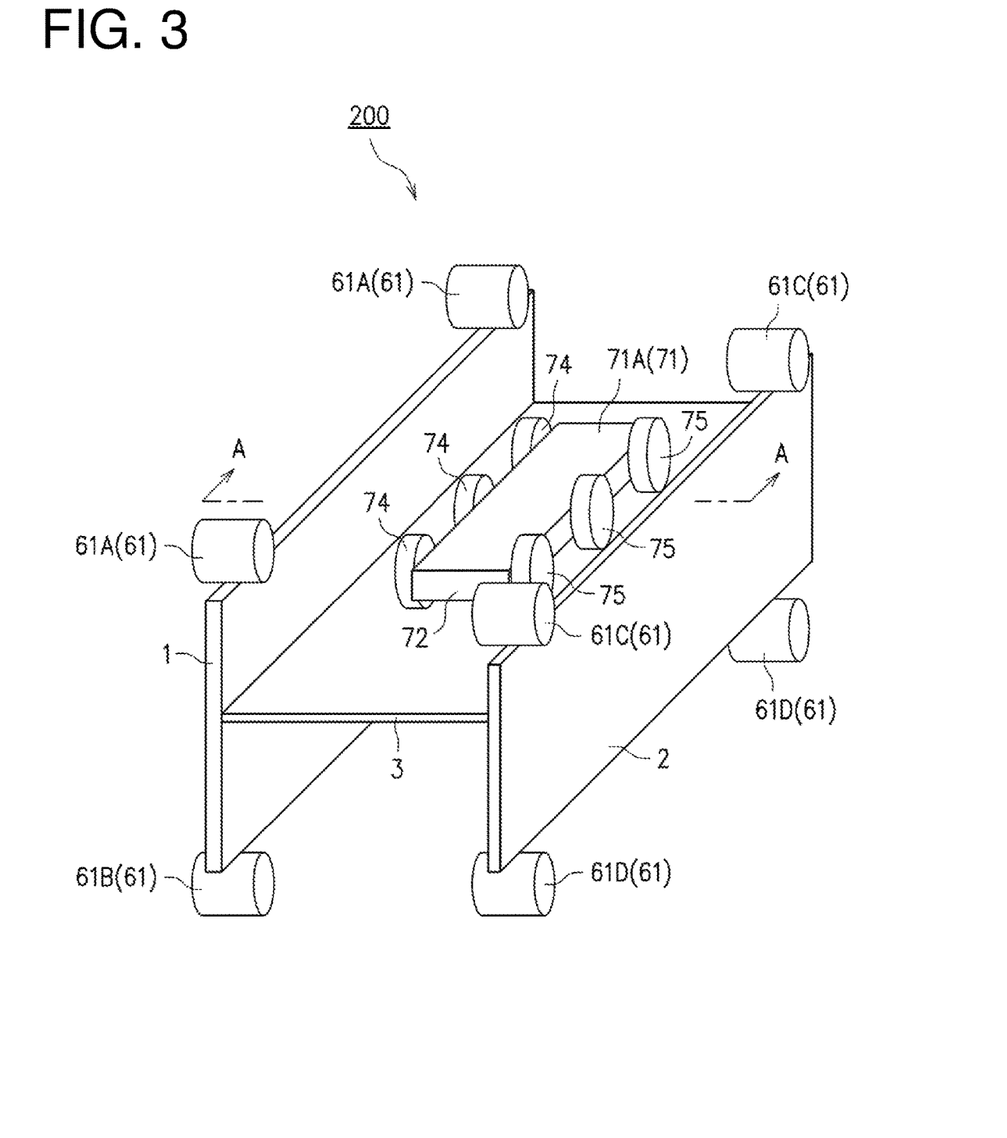
FIG. 3 depicts a schematic perspective view of a laser-welding portion supporting device in the welded shaped steel manufacturing device.
Figure 4:
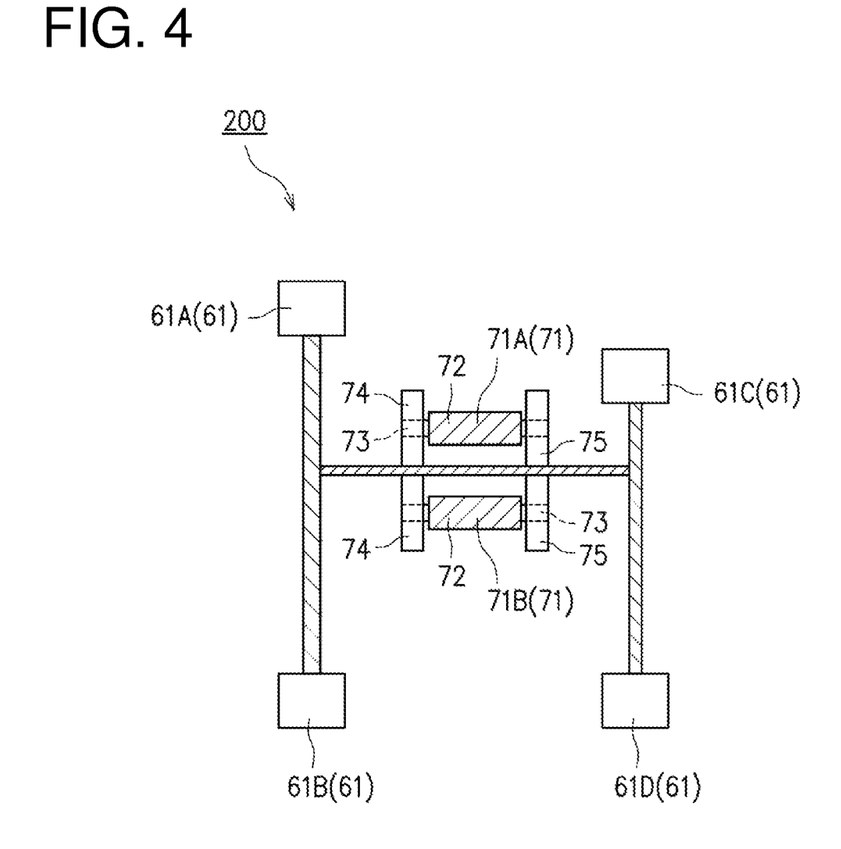
FIG. 4 depicts a cross-sectional view of A-A of FIG. 3.

The welding portion supporting device (200) supports the flange members (1, 2) and web member (3) conveyed by the plate conveying device while further conveying the flange members (1, 2) and web member (3) so as to allow the conveyed flange members (1, 2) and web member (3) to pass through welding points to be irradiated with laser for laser-welding and their surrounding areas. As shown in FIGS. 3, 4, the welding portion supporting device (200) includes a web-member holding roller device (71) configured to hold the web member (3) in a thickness direction so as to allow the web member (3) to travel, and flange-member holding rollers (61) configured to hold the flange members (1, 2) in a width direction so as to allow the flange members (1, 2) to travel.

The web-member holding roller device (71) includes a first web-member holding roller device (71A) arranged on an upper web-surface (one surface) side of the web member (3), and a second web-member holding roller device (71B) arranged on a lower web-surface (the other surface) side of the web member (3).

The first web-member holding roller device (71A) includes a plurality of rollers (74, 75) allowed to roll along an upper web surface of the web member (3) in a conveyance direction, and a supporting frame (72) configured to rotatably support the plurality of rollers (74, 75) through shafts (73). In the same way, the second web-member holding roller device (71B) includes a plurality of rollers (74, 75) allowed to roll along a lower web surface of the web member (3) in a conveyance direction, and a supporting frame (72) configured to rotatably support the plurality of rollers (74, 75) through shafts (73). The upper and lower supporting frames (72) having a predetermined length along a centerline of the web member (3) and extending in a conveyance direction are further configured to support the plurality of rollers (74, 75) arranged at intervals in a conveyance direction on both sides of the supporting frames (72). The plurality of rollers (74, 75) hold the web member (3) in a thickness direction over a predetermined range in a conveyance direction encompassing at least conveyance-direction positions of the welding points. The web roller device (71A) is arranged at a position not to block laser irradiation from above toward the welding points.

The flange-member holding rollers (61) are arranged at ends of the flange members (1, 2), respectively. The height positions of such rollers (61) in a vertical direction (i.e., their height positions) can be adjusted individually by vertical position adjusting devices (not shown) in accordance with the manufacturing of the welded shaped steel in various shapes and dimensions for the respective rollers (61). A plurality of flange-member holding rollers (61) (two rollers in FIG. 3) are arranged at predetermined intervals, respectively, in a conveyance direction at one and the same end of one and the same flange member.

Figure 1:
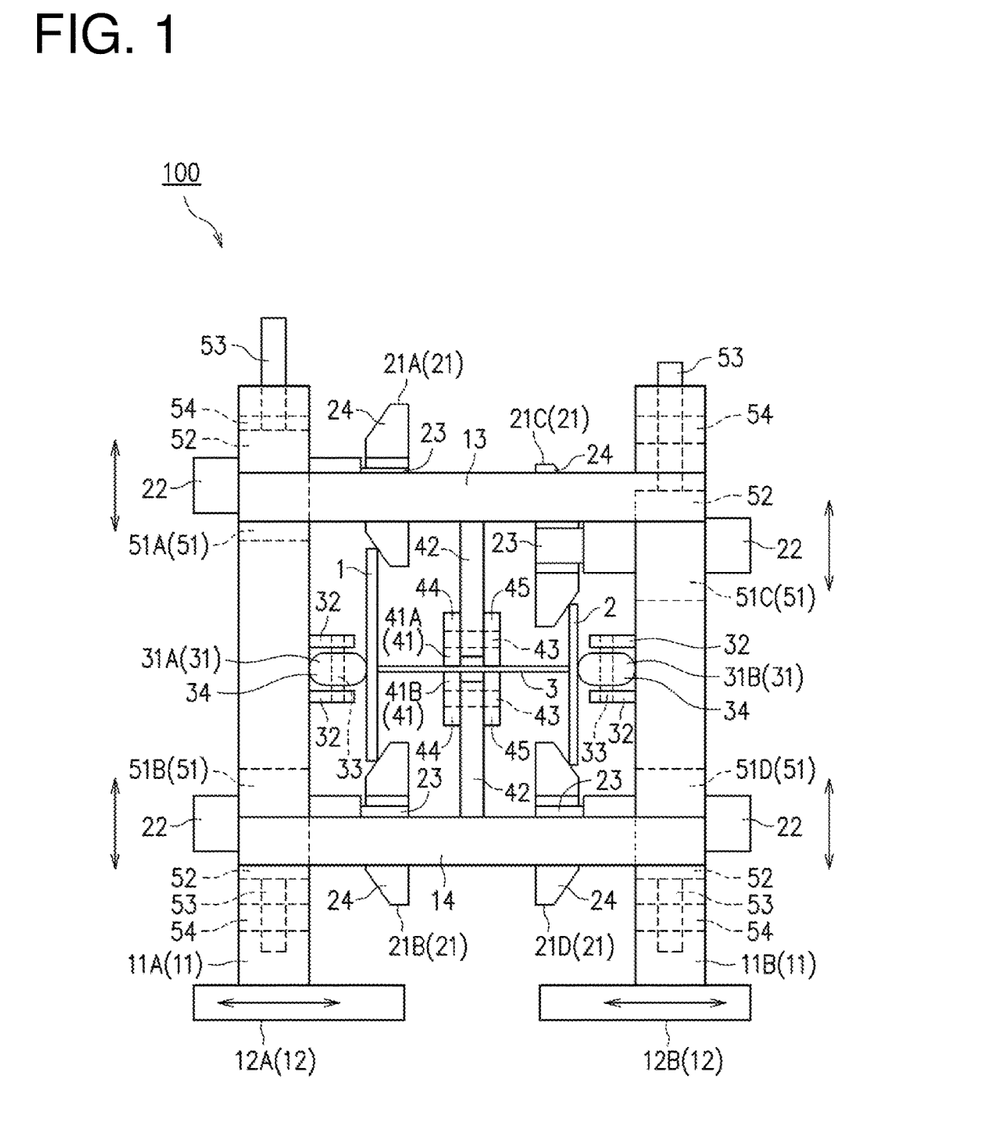
FIG. 1 depicts a schematic cross-sectional view of a schematic configuration of a corrective device in a welded shaped steel manufacturing device.

The corrective device (100) is configured to correct thermal deformation caused by heat input during welding of the flange members (1, 2) of the welded shaped steel conveyed from the welding portion supporting device (200). As shown in FIG. 1, the corrective device (100) includes two stands (11A, 11B), flange-member corrective machines (21A-21D) arranged on the upper and lower portions of the stands (11A, 11B), flange-member supporting machines (31A, 31B) arranged on the stands (11A, 11B), and web-member supporting machines (41A, 41B) attached to lateral-axis members (13, 14) suspended between the stands (11A, 11B).

The two stands (11A, 11B) are arranged to stand on both sides of a conveyance path of the welded shaped steel. The lateral-axis members (13, 14) are suspended on the upper and lower portions between the two stands (11A, 11B). The two stands (11A, 11B) are arranged to stand on stand bases (12A, 12B) movable separately in directions perpendicular to a conveyance direction. The positions of the stands (11A, 11B) can therefore be adjusted in such directions. The movement of the stand bases (12A, 12B) in such directions can be realized through the use of well-known techniques such as a feed screw mechanism.

The flange-member corrective machines (21A-21D) are arranged on the stands (11A, 11B) for the respective ends of the flange members (1, 2) of the conveyed welded shaped steel. Each of the machines (21A-21D) includes a lateral member (22), a flange-member correcting roller (24) rotatably attached to a shaft (23) connected to an end of the lateral member (22) (end on a conveyance-path side), and a flange-member correcting roller positioning machine (51) configured to adjust the height position of the flange-member correcting roller (24).

Each of the flange-member correcting rollers (24) having a conical surface is configured to press, by means of the conical surface, the end of each flange member (1, 2) on a side of web member (3) to correct the thermal deformation of each flange member (1, 2) over a range from each end of each flange member (1, 2) to a butt portion of each flange member (1, 2) against the web member (3). The flange-member correcting rollers (24) are configured such that they are movable along with the stands (11) in directions perpendicular to a conveyance direction and fixable at a desired position in such directions, as well as such that they are movable, by virtue of the flange-member correcting roller positioning machines (51), in vertical directions and fixable at a desired height position in such directions. The height positions of the four flange-member correcting rollers (24) can be adjusted independently, and therefore, these rollers (24) can apply independent pressures, respectively, to the ends of the flange members (1, 2).

Each of the flange-member correcting roller positioning machines (51) includes a movable member (52) having the lateral member (22) fitted and fixed therein, a bolt (53) having an end thereof rotatably connected to the movable member (52), and a female screw member (54) fixed to the stand (11) and having a female screw engaged with the bolt (53). According to such machines (51), by rotating the bolt (53), the movable member (52) along with the flange-member correcting roller (24) can move in a vertical direction, which allows the adjustment of the height position of this roller (24).

The flange-member supporting machines (31A, 31B) are attached to the stands (11A, 11B), respectively. Each of the machines (31A, 31B) includes a pair of fixed frames (32) attached securely to the stand (11A, 11B), and a flange-member supporting roller (34) rotatably arranged on a shaft (33) extending between the pair of fixed frames (32). Each of the flange-member supporting rollers (34) is configured to, while being rotatable, support the butt portion of the web member (3) and the flange member (1, 2) butting against each other from a surface of the flange member (1, 2) opposite to the butt portion.

The web-member supporting machines (41A, 41B) are arranged, respectively, on the lateral-axis members (13, 14) suspended, respectively, on the upper and lower portions between the stands (11A, 11B). The machines (41A, 41B) include supporting frames (42) extending from the lateral-axis members (13, 14) toward the web member (3), respectively, and each of the machines (41A, 41B) includes web-member supporting rollers (44, 45) arranged on both sides of each supporting frame (42) and rotatably arranged on each shaft (43) attached securely to the supporting frame (42). The web-member supporting machines (41A, 41B) are arranged above and below the web member (3), and the web-member supporting rollers (44, 45) arranged above and below the web member (3) support the web member (3) so as to restrict its movement downward and upward in a vertical direction, respectively.

Secondary, explanations will be provided for the welded shaped steel manufacturing method in an embodiment.

In the corrective device (100), the lateral-direction positions of the flange-member supporting rollers (34) are adjusted by moving the stand bases (12A, 12B) in accordance with the shapes and dimensions of the welded shaped steel to be manufactured. At the same time, the height positions of the four flange-member correcting rollers (24) are adjusted individually through the use of their respective flange-member correcting roller positioning machines (51), for the respective positions of the upper and lower ends (1a, 1b, 2a, 2b), in accordance with the amounts of thermal deformation generated on the flange members (1, 2) of the welded shaped steel. In particular, by the flange-member correcting roller positioning machines (51), the flange-member correcting rollers (24) for pressing a relatively higher level of thermally deformed portions of the flange members (1, 2) are positioned to be closer to the web member (3) in comparison with the flange-member correcting rollers (24) for pressing a relatively lower level of thermally deformed portions of the flange members (1, 2). As a result, different degrees of corrective forces, in accordance with the amounts of thermal deformation generated on their respective portions, can be applied to their respective ends of the flange members (1, 2). In the welding-portion supporting device (200), the height positions of the four flange-member holding rollers (61) are adjusted individually by the above-described vertical position adjusting devices for the respective positions of the upper and lower ends (1a, 1b, 2a, 2b) of the flange members (1, 2) of the welded shaped steel.

After the completion of positioning the flange-member correcting rollers (24) and the like, the two flange members (1, 2) along with the web member (3) arranged in advance so as to have an H-shaped cross-section are conveyed by the plate conveying device (not shown) to the welding portion supporting device (200).

For the welding portion supporting device (200), as shown in FIGS. 3, 4, through said device (200), the first flange member (1) and the second flange member (2) along with the web member (3) are conveyed, while the first flange member (1) being held by the flange-member holding rollers (61A, 61B), the second flange member (2) being held by the flange-member holding rollers (61C, 61D), the web member (3) being held by the rollers (74, 75) of the web-member holding roller device (71). Then, on said device (200), the ends of the web member (3) are laser-welded, at predetermined welding positions, for weld-bonding with the flange members (1, 2). In this step, the flange members (1, 2) are subjected to thermal deformation, which is caused by heat input during welding, in such a manner that they are bent toward a side of web member (3).

In the corrective device (100), as shown in FIG. 1, in a state where the web member (3) of the welded shaped steel conveyed from the welding portion supporting device (200) is supported from above and below by the web-member supporting rollers (44, 45), as well as in a state where the flange members (1, 2) are supported from right and left by the flange-member supporting rollers (34), the ends of the flange members (1, 2) on a side of web member (3) are pressed, by the four flange-member correcting rollers (24), with their respective pressures independently. By virtue of such a step, each bending moment acts on a range of the flange member (1, 2) from each end thereof to the butt portion thereof butting against the web member (3), thereby correcting the thermal deformation for each amount. At this moment, the butt portion of the flange member (1, 2) butting against the end of the web member (3) is supported by the flange-member supporting roller (34), and therefore, no bending moment or a minute amount of bending moment acts on the web member (3).

According to the above-described welded shaped steel manufacturing device and method as embodiments of the present invention, ends of the flange members (1, 2) are pressed by four flange-member correcting rollers (24) with their respective pressures independently, in a state of the web member (3) being supported by the web-member supporting rollers (44, 45) as well as the flange-members (1, 2) being supported by the flange-member supporting rollers (34), which enables the correction in accordance with the amounts of thermal deformation generated on their respective portions. Further, butt portions of the flange members (1, 2) butting against the ends of the web member (3) are supported by the flange-member supporting rollers (34) from surfaces opposite to the butt portions, which enables the suppression in amount of a bending moment acting on the web member (3) out of bending moments acting in-between the flange-member correcting rollers (24) and the web-member supporting rollers (44, 45) to be zero or minute. As a result, the bending deformation of the web member (3) can be prevented or suppressed when correcting the thermal deformation of the flange members (1, 2).

Still further, according to the welded shaped steel manufacturing device and method as embodiments of the present invention, the height positions of the flange-member correcting rollers (24) can be adjusted individually by the flange-member correcting roller positioning machines (51) for the respective flange-member corrective machines (21), which enables the adjustment of pressures applied to their respective ends of the flange members (1, 2) as well as the ease of positioning the flange-member correcting rollers (24) at the respective ends of the flange members of the welded shaped steel in various shapes and dimensions.

Other Embodiments

Figure 5:
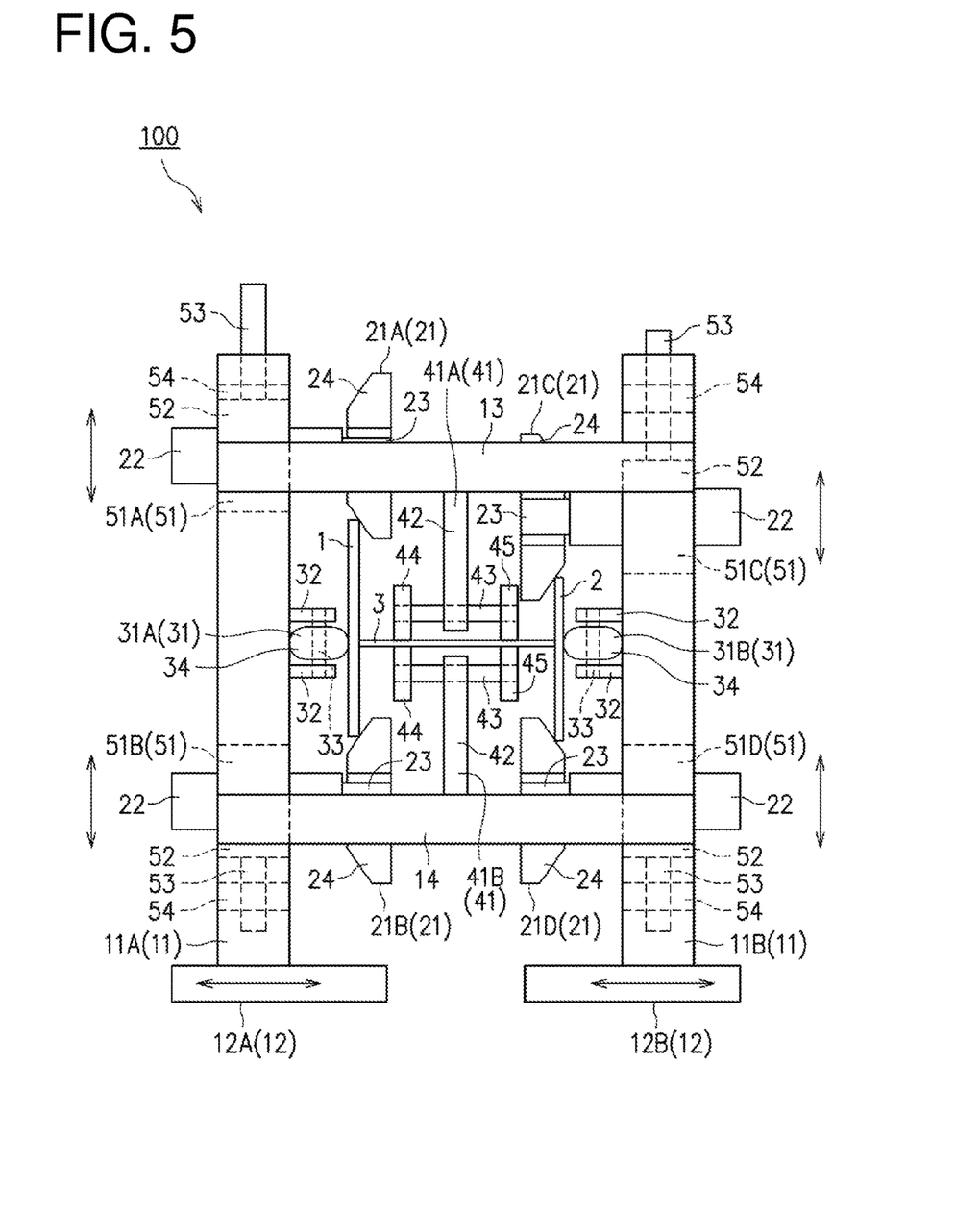
FIG. 5 depicts a schematic cross-sectional view of a schematic configuration of a corrective device in a welded shaped steel manufacturing device as another embodiment.

The distance between the web-member supporting rollers (44) and the web-member supporting rollers (45) arranged, respectively, on both sides of the web-member supporting machines (41) shall not be limited to an embodiment shown in FIG. 1, but may be different from such an embodiment. The distance may be as broad as the maximum realized through the use of a longer shaft (43), as shown in FIG. 5, to such an extent that the both-sided web-member supporting rollers (44, 45) do not interfere with the flange-member correcting rollers (24). Alternatively, each of the web-member supporting rollers (44, 45) arranged, respectively, on both sides may have a width as broad as possible to such an extent that the both-sided web-member supporting rollers (44, 45) do not interfere with the flange-member correcting rollers (24). Such configurations enable further suppression of the bending moments acting on the web member (3), and as a result, further suppression of the bending deformation of the web member (3), upon the correction of the thermal deformation generated on the flange members (1, 2).

In an embodiment described above, the laser welding is adopted as a welding method; however, it may be replaced by, for example, electron beam welding, arc welding, high-frequency welding, and the like.

In an embodiment described above, the corrective device (100) includes a single-stage machine of flange-member corrective machines (21), a single-stage machine of flange-member supporting machines (31), and a single-stage machine of web-member supporting machines (41). It is preferable, however, that the corrective device (100) includes: flange-member corrective machines (21) as a plurality of multiple-stage machines; flange-member supporting machines (31) as a plurality of multiple-stage machines; and web-member supporting machines (41) as a plurality of multiple-stage machines, all of which are arranged in a conveyance direction. The greater the number of stages is, the higher the correctness in correcting the thermal deformation of the flange members (1, 2).

Figure 7:
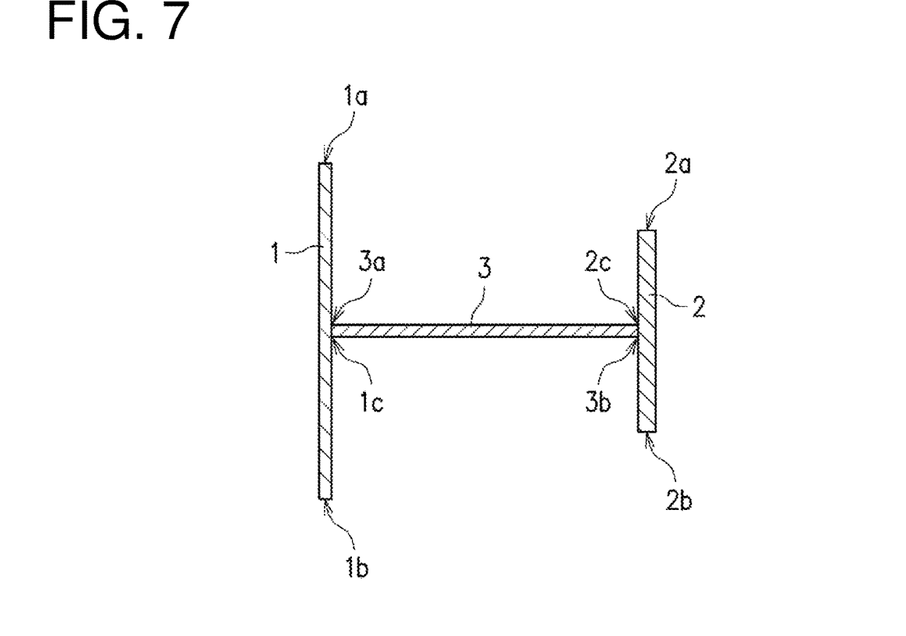
FIG. 7 depicts a cross-sectional view of an example of asymmetric welded H-shaped steel as another embodiment.
Figure 8:
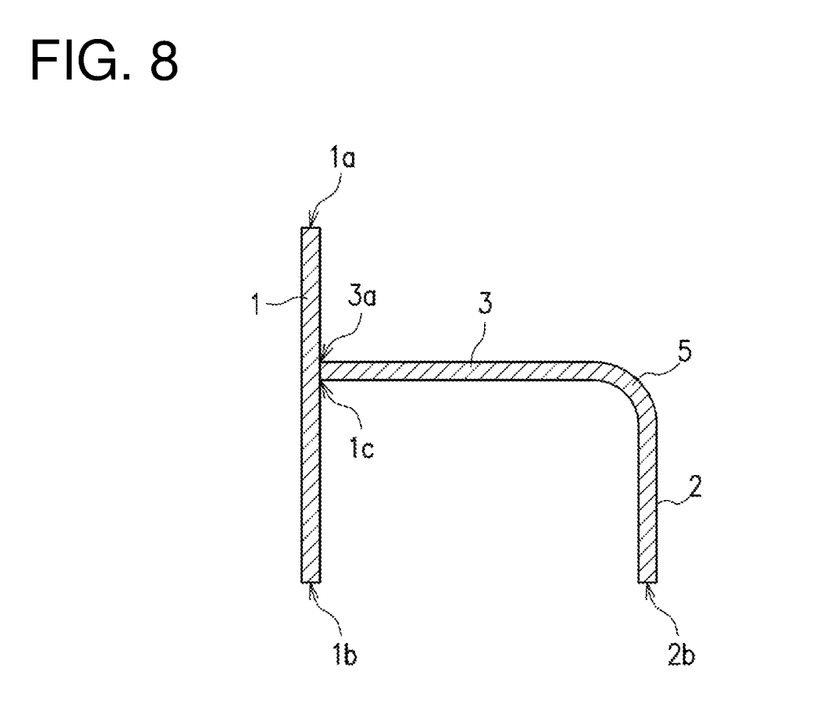
FIG. 8 depicts a cross-sectional view of an example of asymmetric welded shaped steel (J-shaped steel) as another embodiment.

The welded shaped steel manufacturing device and method in an embodiment described above may be suitably applied not only in manufacturing asymmetric welded H-shaped steel like the one shown in FIG. 2 but also in manufacturing other sorts of "asymmetric welded shaped steel" including for example: two flange members connected to ends of a web member, which are different from each other in at least any one of material, plate thickness, and plate width; two flange members which are the same as each other in material, plate thickness, and plate width but are different from each other in connection position to an end of a web member; or a flange member welded to only one end of a web member, such as those of J-shaped steel and T-shaped steel. The welded shaped steel manufacturing device and method may also be suitably applied in manufacturing the relevant examples of "asymmetric welded shaped steel" as shown in FIGS. 6-8.

Figure 6:
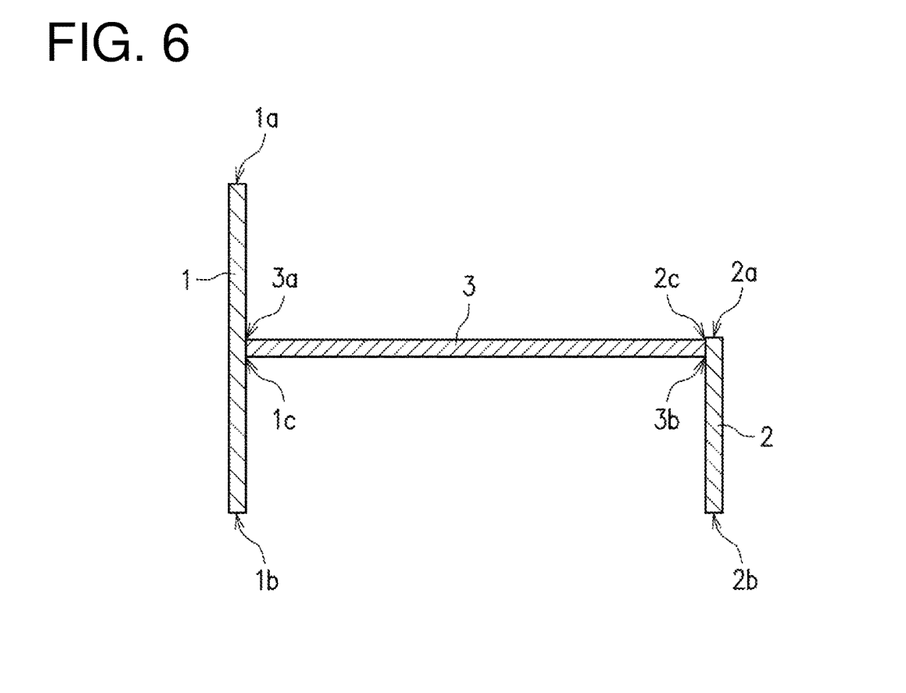
FIG. 6 depicts a cross-sectional view of an example of asymmetric welded shaped steel as another embodiment.

In "asymmetric welded shaped steel" shown in FIG. 6, first and second flange members (1, 2) are the same as each other in plate thickness but different from each other in plate width and connection position to a web member (3). For example, the first flange member (1) is a plate having a width of 100 mm, a length of 8 m, and a thickness of 3.2 mm, and a connection position (1c) for the plate to be connected to the web member (3) is set 50-mm apart from an upper end (1a)

and 50-mm apart from a lower end (1b). The second flange member (2) is a plate having a width of 52 mm, a length of 8 m, and a thickness of 3.2 mm, and a connection position (2c) for the plate to be connected to the web member (3) is set 2-mm apart from an upper end (2a) and 50-mm apart from a lower end (2b). The web member (3) is a plate having a width of approximately 150 mm, a length of 8 m, and a thickness of 3.2 mm, and its ends (3a, 3b) are connected to the first and second flange members (1, 2), respectively.

To manufacture the "asymmetric welded shaped steel" like the one shown in FIG. 6, the welded shaped steel manufacturing device and method as an embodiment according to the present invention are applied in such a manner that: in the welding portion supporting device (200), the height positions of the four flange-member holding rollers (61) are adjusted separately through the use of the above-described vertical position adjusting devices for the upper and lower ends (1a, 1b, 2a, 2b), respectively, of the flange members (1, 2) of the welded shaped steel; and, in the corrective device (100), the lateral-direction positions of the flange-member supporting rollers (34) are adjusted separately by moving the stand bases (12A, 12B) in accordance with the positions of surfaces of the flange members (1, 2) opposite to a side of web member (3) of the welded shaped steel, and the height positions of three flange-member correcting rollers (24) are adjusted separately through the use of the flange-member correcting roller positioning machines (51) in accordance with the positions of the upper and lower ends (1a, 1b) of the first flange member (1) and the lower end (2b) of the second flange member (2), respectively, of the welded shaped steel (see FIG. 6). It is to be noted that, for such a sort of "asymmetric welded shaped steel" shown in FIG. 6, the second flange member (2) has little portion above the web member (3), and therefore, the upper end (2a) of the second flange member (2) does not need to butt against a flange-member correcting roller (24). It follows that, of the flange-member corrective machines (21A-21D) shown in FIG. 1, the flange-member corrective machine (21C) in the upper right may remain out of operation.

In "asymmetric welded shaped steel" shown in FIG. 7, first and second flange members (1, 2) both have the central portions in a width direction as connection positions to a web member (3) but are different from each other in plate thickness and plate width. For example, the first flange member (1) is a plate having a width of 100 mm, a length of 8 m, and a thickness of 2.3 mm, and a connection position (1c) for the plate to be connected to the web member (3) is 50-mm apart from an upper end (1a) and 50-mm apart from a lower end (1b). The second flange member (2) is a plate having a width of 60 mm, a length of 8 m, and a thickness of 3.2 mm, and a connection position (2c) for the plate to be connected to the web member (3) is 30-mm apart from an upper end (2a) and 30-mm apart from a lower end (2b). The web member (3) is a plate having a width of approximately 100 mm, a length of 8 m, and a thickness of 2.3 mm, and its ends (3a, 3b) are connected to the first and second flange members (1, 2), respectively.

The welded shaped steel shown in FIG. 7 is different from other "asymmetric welded shaped steel" shown in FIGS. 2, 6, 8 in that the height positions of the lower ends (1b, 2b) of the flange members (1, 2) of the latter are not the same as each other when viewed from a position of the web member (3) placed horizontally. However, this sort of welded shaped steel can also be manufactured by enjoying suitable application of the manufacturing device as an embodiment according to the present invention, because the device is configured to perform welding and correction of thermal deformation based on the position of the web member (3). The welded shaped steel manufacturing device and method as an embodiment according to the present invention can be applied to the welded shaped steel shown in FIG. 7 in the same way as to the welded shaped steel shown in FIG. 2.

For "asymmetric welded shaped steel" shown in FIG. 8, there is used an L-shaped cross-section member formed by bending a plate so as to make a bend portion (5) and two sections across the bend portion (5), of which one section serves as a second flange member (2) and the other section serves as a web member (3), having an L-shaped cross-section. This is a J-shaped steel formed by weld-connecting one end (3a) of the web member (3), which is the other section of the L-shaped cross-section member, to a first flange member (1) in such a manner that the web member (3) and the first flange member (1) are perpendicular to each other, and that a connection position (1c) for the first flange member (1) and the web member (3) is slightly off the central portion of the flange member (1) in a width direction. For example, the first flange member (1) is a plate having a width of 100 mm, a length of 8 m, and a thickness of 3.2 mm. The second flange member (2) is a plate having a width of approximately 55 mm, a length of 8 m, and a thickness of 3.2 mm, and the plate is configured such that the second flange member (2) continues through the bend portion (5) to the web member (3). The connection position (1c) for the first flange member (1) to be connected to the web member (3) is 45-mm apart from an upper end (1a) of the first flange member (1) and 55-mm apart from a lower end (1b) on the first flange member (1).

To manufacture the "asymmetric welded shaped steel" like the one shown in FIG. 8, the welded shaped steel manufacturing device and method as an embodiment according to the present invention are applied in such a manner that: in the welding portion supporting device (200), the height positions of the three flange-member holding rollers (61A, 61B, 61C) are adjusted separately through the use of the above-described vertical position adjusting devices for the upper and lower ends (1a, 1b), respectively, of the first flange member (1) and a lower end (2b) of the second flange member (2) of the welded shaped steel; and, in the corrective device (100), the lateral-direction position of one flange-member supporting roller (34) is adjusted by moving the stand bases (12A, 12B) in accordance with the position of a surface of the first flange member (1) opposite to a side of web member (3) of the welded shaped steel, and the height positions of two upper and lower flange-member correcting rollers (24) connected to one stand (11A) are adjusted separately though the use of the flange-member correcting roller positioning machines (51) in accordance with the positions of the upper and lower ends (1a, 1b) of the first flange member (1), respectively, of the welded shaped steel (see FIG. 8). It is to be noted that, for such a sort of "asymmetric welded shaped steel" shown in FIG. 8, the second flange member (2) has no portion at all above the web member (3), and therefore, of the flange-member corrective machines (21A-21D) shown in FIG. 1, the flange-member corrective machine (21C) in the upper right may leave its flange-member correcting roller (24) out of operation. Because the second flange-member (2) is sufficiently away from the welding position, the flange-member corrective machine (21D) in the lower right may also leave its flange-member correcting roller (24) out of operation. The lower end (2b) of the second flange member (2) may remain unpressed.

INDUSTRIAL APPLICABILITY

The present invention can be applied to a device and a method for manufacturing welded shaped steel to correct in shape thermal deformation caused by heat input during welding.

REFERENCE NUMERALS

1 First flange member
1a Upper end
1b Lower end
1c Position
2 Second flange member
2a Upper end
2b Lower end
2c Position
3 Web member
3a End
3b End
24 Flange-member correcting rollers
34 Flange-member supporting rollers
44, 45 Web-member supporting rollers
51 Flange-member correcting roller positioning machines
100 Corrective device

What is claimed is:

1. A welded shaped steel manufacturing device for weld-connecting a butt portion of a web member having an end butting perpendicularly against a flange member and thereafter correcting in shape the flange member subjected to thermal deformation caused by heat input during welding, the device comprising:
    a corrective device including
        flange-member correcting rollers arranged for respective ends of the flange member, each configured to press each end on a web-member side of the flange member so as to correct the thermal deformation over a range of the flange member from each end thereof to the butt portion thereof against the web member,
        flange-member correcting roller positioning machines capable of adjusting positions of the respective flange-member correcting rollers in a direction from a weld-connected portion toward an end of the flange member weld-connected to the web member, along a surface of the flange member between the weld-connected portion and the end, and
        web-member supporting rollers configured to support a web surface of the web member, wherein
        the flange-member correcting rollers arranged for the respective ends of the flange member apply independent pressures to the respective ends so as to correct the thermal deformation, and wherein
        each of the flange-member correcting rollers has a conical surface, whose rotational axis is along a direction perpendicular to the surface of the flange member before being subjected to thermal deformation, to press each end of the flange member.

2. The welded shaped steel manufacturing device according to claim 1, wherein the corrective device further includes a flange-member supporting roller configured to support the butt portion of an end of the web member and the flange member butting against each other from a surface of the flange member opposite to the butt portion.

3. A welded shaped steel manufacturing method including the steps of causing an end of a web member to butt perpendicularly against a flange member, weld-connecting a butt portion, and thereafter, correcting in shape the flange member subjected to thermal deformation caused by heat input during welding, the method comprising the steps of:
    adjusting positions of, by flange-member correcting roller positioning machines, the flange-member correcting rollers in a direction from a weld-connected portion toward an end of the flange member weld-connected to the web member, along a surface of the flange member between the weld-connected portion and the end, so that the flange-member correcting rollers are arranged for respective ends of the flange member, and
    applying, by the flange-member correcting rollers arranged for the respective ends of the flange member, independent pressures to the respective ends on a web-member side of the flange member, while supporting, by web-member supporting rollers, a web surface of the web member, wherein each of the flange-member correcting rollers has a conical surface, whose rotational axis is along a direction perpendicular to the surface of the flange member before being subjected to thermal deformation, to press each end of the flange member,
    thereby correcting the thermal deformation over a range of the flange member from each end thereof to the butt portion thereof against the web member.

4. The welded shaped steel manufacturing method according to claim 3, wherein said thermal deformation is corrected, while supporting, by a flange-member supporting roller, the butt portion of an end of the web member and the flange member butting against each other from a surface of the flange member opposite to the butt portion.

* * * * *

UNITED STATES PATENT AND TRADEMARK OFFICE
CERTIFICATE OF CORRECTION

PATENT NO. : 10,293,438 B2
APPLICATION NO. : 15/717664
DATED : May 21, 2019
INVENTOR(S) : Hiroshi Asada, Yasuhiro Sakurada and Tooru Ienari

Page 1 of 1

It is certified that error appears in the above-identified patent and that said Letters Patent is hereby corrected as shown below:

On the Title Page

Foreign Application Priority Data is missing. Add the following, after the section Related U.S. Application Data:
--(30) Foreign Application Priority Data: March 31, 2015 (JP) 2015-071855--

Signed and Sealed this
Twenty-ninth Day of October, 2019

Andrei Iancu
*Director of the United States Patent and Trademark Office*